United States Patent [19]
Weirich et al.

[11] Patent Number: 5,265,977
[45] Date of Patent: Nov. 30, 1993

[54] METHOD AND APPARATUS FOR TREATING CONTAMINATED SOIL

[76] Inventors: Frank H. Weirich, 630 Park Rd., Iowa City, Iowa 52246; Claudia A. Wright, 2108 10th St., Coralville, Iowa 52241; Jon K. Hake, 346 Hawkeye Dr., Iowa City, Iowa 52246

[21] Appl. No.: 918,061

[22] Filed: Jul. 24, 1992

Related U.S. Application Data

[62] Division of Ser. No. 656,499, Feb. 19, 1991, Pat. No. 5,161,326.

[51] Int. Cl.⁵ ............................ B09B 3/00; B09B 1/00
[52] U.S. Cl. .................................. 405/128; 405/258; 432/14; 110/346
[58] Field of Search ............... 405/128, 129, 258, 303; 432/13, 14, 106, 112, 72; 110/346, 226, 236

[56] References Cited

U.S. PATENT DOCUMENTS

| | | | |
|---|---|---|---|
| 4,140,478 | 2/1979 | Kawakami et al. | 432/13 |
| 4,437,834 | 3/1984 | Vogel | 432/14 |
| 4,439,141 | 3/1984 | Deckebach | 432/14 |
| 4,462,793 | 7/1984 | Maeda et al. | 432/14 |
| 4,478,572 | 10/1984 | Selli | 432/13 |
| 4,600,379 | 7/1986 | Elliott | 432/13 |
| 4,784,603 | 11/1988 | Robak et al. | 110/236 X |
| 4,815,398 | 3/1989 | Keating et al. | 110/346 X |
| 4,974,528 | 12/1990 | Barcell | 110/346 X |
| 5,085,581 | 2/1992 | Mendenhall | 432/106 X |

*Primary Examiner*—Dennis L. Taylor
*Attorney, Agent, or Firm*—James C. Nemmers

[57] ABSTRACT

A method and apparatus for treating soil contaminated with hydrocarbons by breaking up the soil into discretes and passing the particles through an open flame to cause the volatile substances in them to vaporize and burn. The apparatus is preferably portable and provides for continuous processing of the contaminated soil on-site so that it can be immediately returned to the ground free from contamination.

14 Claims, 3 Drawing Sheets

METHOD AND APPARATUS FOR TREATING CONTAMINATED SOIL

BACKGROUND OF THE INVENTION

This is a division, of application Ser. No. 656,499, filed Feb. 19, 1991, now U.S. Pat. No. 5,161,326.

In recent years there has occurred at all levels of government the enactment of laws and regulations directed toward protecting and cleaning up the environment. One problem to which these environmental laws have been directed is the prevention and cleanup of soil which has become contaminated through intentional and unintentional spilling of a variety of chemical wastes by individuals, businesses and industries. The tremendous increase in the use of the automobile during the last several decades and the rapid growth of automotive businesses and industries resulting from this increase have contributed a substantial amount to contamination of the environment. For example, the many service stations providing fuel and other petroleum products and related services for vehicles have resulted in the spillage of materials containing hydrocarbons that contaminate the soil. The operation of and waste disposal by chemical and petro chemical plants has resulted in similar soil contamination. Also, accidental spills resulting from truck and rail transport mishaps contaminate the soils on public and private right of ways. If these contaminants are not removed from the soil, they eventually may leach into the groundwater and create further environmental problems that are difficult to remedy. In order to properly protect the environment from further damage, it is essential that these contaminants be removed promptly upon discovery, and many of the laws at local, state and federal levels are forcing landowners and others to take all possible steps to remove these contaminants.

At the present time, sites contaminated with hydrocarbons are subject to stringent regulations regarding the removal and disposal of contaminated soil. Soil known to be contaminated often must be excavated, and the contaminated soil transported to landfills which have been designated to receive the contaminated soil. The soil excavated from the original contaminated site must of course be replaced with soil that is contamination free. Obviously, this is an expensive process. More importantly, this procedure for cleaning up the environment does not solve the contamination problem but merely moves the contaminated soil from one site to a site where it will hopefully do less harm. However, the overall environment remains contaminated, and in the process of removing the contaminated soil and transporting it to these designated landfills, the environment is exposed to further contamination. But more importantly, the soil remains in a contaminated state, and poses future problems for the area of the landfill and surrounding environment. Moreover, because of the limited number of available sites for depositing these hazardous substances, and because those owning property in the vicinity of the sites vigorously object to them, the solution to the problem is less than satisfactory and may in the long range create more problems than it solves. Other treatment methods such as air stripping have often proven to be even more expensive, intractable or ineffective.

There is therefore a need for a way of cleaning up the soil at the original contaminated site and returning it to the ground contamination-free.

There is a further need for a way of on-site processing of contaminated material which will clean up the soil at a considerably less cost than present methods, and thus make the environmental improvement available to those who might otherwise be subject to substantial economic loss if forced, as they are, to clean up their property by the various governmental agencies.

There is a further need for removing contaminants from soil by actually removing the contaminants from the soil rather than removing the contaminated soil and merely moving the soil to another disposal site without eliminating the contamination itself.

SUMMARY OF THE INVENTION

The invention provides a method and a portable apparatus for treating the contaminated material on-site. According to the preferred embodiment of the invention, the contaminated soil is excavated and fed into the hopper of a portable apparatus where it is screened and passed through a feed auger which serves to break the material into small discrete particles which are passed through a pre-heating stage. As the discrete particles are passed through this pre-heating stage, the particles are both agitated and heated. The particles are then passed through a burning stage in which the particles, while being agitated, are moved directly through the flames of burners so as to vaporize and ignite the volatile materials in the soil particles. The particles are then cooled and delivered back to the ground from which the soil was excavated. Any of the volatile materials flashed from the material during the burning stage can be collected as by-products, or if free of contaminants the vapors can be discharged into the atmosphere. If the volatile materials still contain contaminants, the vapors can be cleaned by suitable scrubbers before being discharged into the atmosphere.

DESCRIPTION OF THE PREFERRED EMBODIMENT OF THE INVENTION

Figure 1:
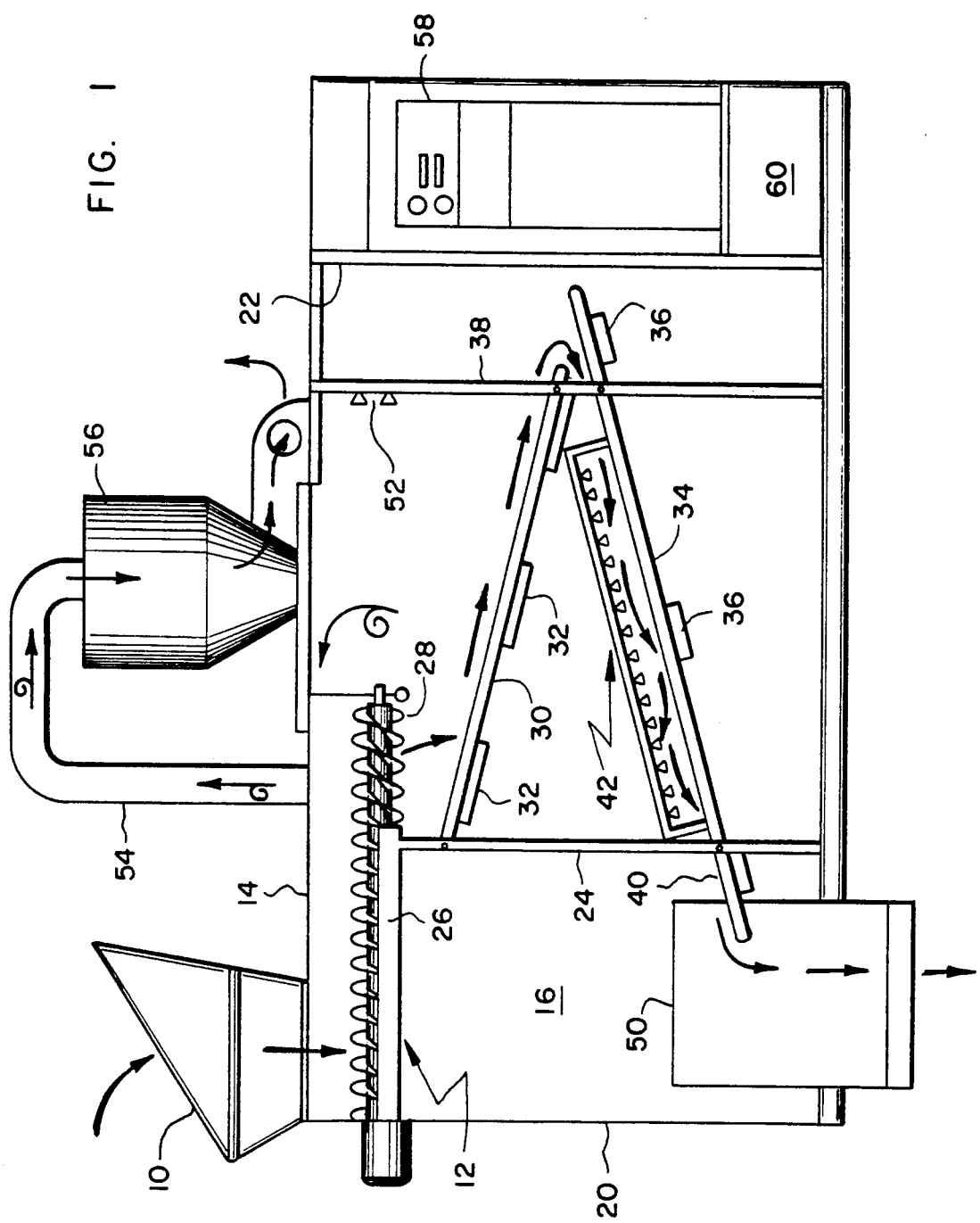
FIG. 1 is a side elevation view with the side wall removed to illustrate an apparatus constructed according to the principles of the invention.

The primary use for the method and apparatus of the invention is for the on-site elimination of environmental contaminants from the soil. Thus, the apparatus illustrated in the drawings and described hereinafter is preferably a mobile apparatus that is mounted on the chassis of a self-propelled vehicle, a trailer frame, barge or other vessel, railway car or any other means for easily moving the apparatus from place to place. However, it will be understood that the principles of the invention can be applied to the removal and separation of volatilizable substances from materials other than soil and can be employed in connection with an apparatus that is installed at a stationary site such as a conventional landfill.

Referring now to the drawings, there is illustrated an apparatus consisting of a plurality of components arranged to carry out the method of the invention. The process will be described in connection with the removal of contaminants from soil, but it should be understood that the process is applicable to the removal of volatilizable substances from any solid material which is capable of being broken into relatively small discrete particles.

Contaminated soil which has been excavated from the ground is delivered into a hopper 10 which contains a size limiting screen that will separate large particles, stones and other foreign matter from the smaller discrete particles. The smaller particles of soil that pass through the screen are delivered by gravity onto a transverse conveyor, such as a screw-type auger 12, which will convey the soil particles into the first-stage treatment area. The auger 12 will also further break the material up into smaller discrete particles as the auger rotates. The hopper 10 is located on the upper wall 14 of the apparatus which wall 14 is supported on side walls 16 and end walls 20 and 22. The walls provide a chamber that is partially enclosed and open at the bottom. This serves to confine the heat produced during the process and provides a means for controlling the vapors produced so that they can be collected or treated before discharge into the atmosphere.

As best seen in FIG. 1, the hopper 10 is located near end wall 20, and the auger 12 is supported at one end on end wall 20 and at the other end on a vertical support 24. The auger 12 includes a trough 26 that will confine the material until it reaches the discharge end 28 of the auger 12 from where the particles of material drop onto a conveyor, such as a downwardly sloping ramp 30 that allows the material to move by gravity. Ramp 30 preferably extends between the side walls 16, and the angle of inclination of ramp 30 can be adjusted by any suitable means (not shown) so as to accommodate different material transportation rates. Ramp 30 has operatively attached to it vibrating units 32 which assist gravity in moving the material down the ramp 30 while projecting the particles of material into the hot air of the chamber. Vibrating units 32 also will further disaggregate any remaining large particles of the soil into smaller discrete particles.

The particles that are discharged from the lower end of ramp 30 are discharged onto the upper end of another conveyor, such as second ramp 34 which also slopes downwardly in the manner illustrated in FIG. 1 to allow gravity to move the particles of material along the ramp. Ramp 34 also extends between side walls 16, and the slope of ramp 34 is also preferable adjustable. Ramps 30 and 34 are supported at their ends by the vertical support 24 and a second vertical support 38. Ramp 34 is provided with vibrating units 36 which serve to move the particles of soil downwardly along the ramp 34. Vibrating units 36 also will cause the particles of soil to become airborne, projecting the particles upwardly from the ramp 34 as they move down the ramp toward the discharge end 40.

Figure 4:
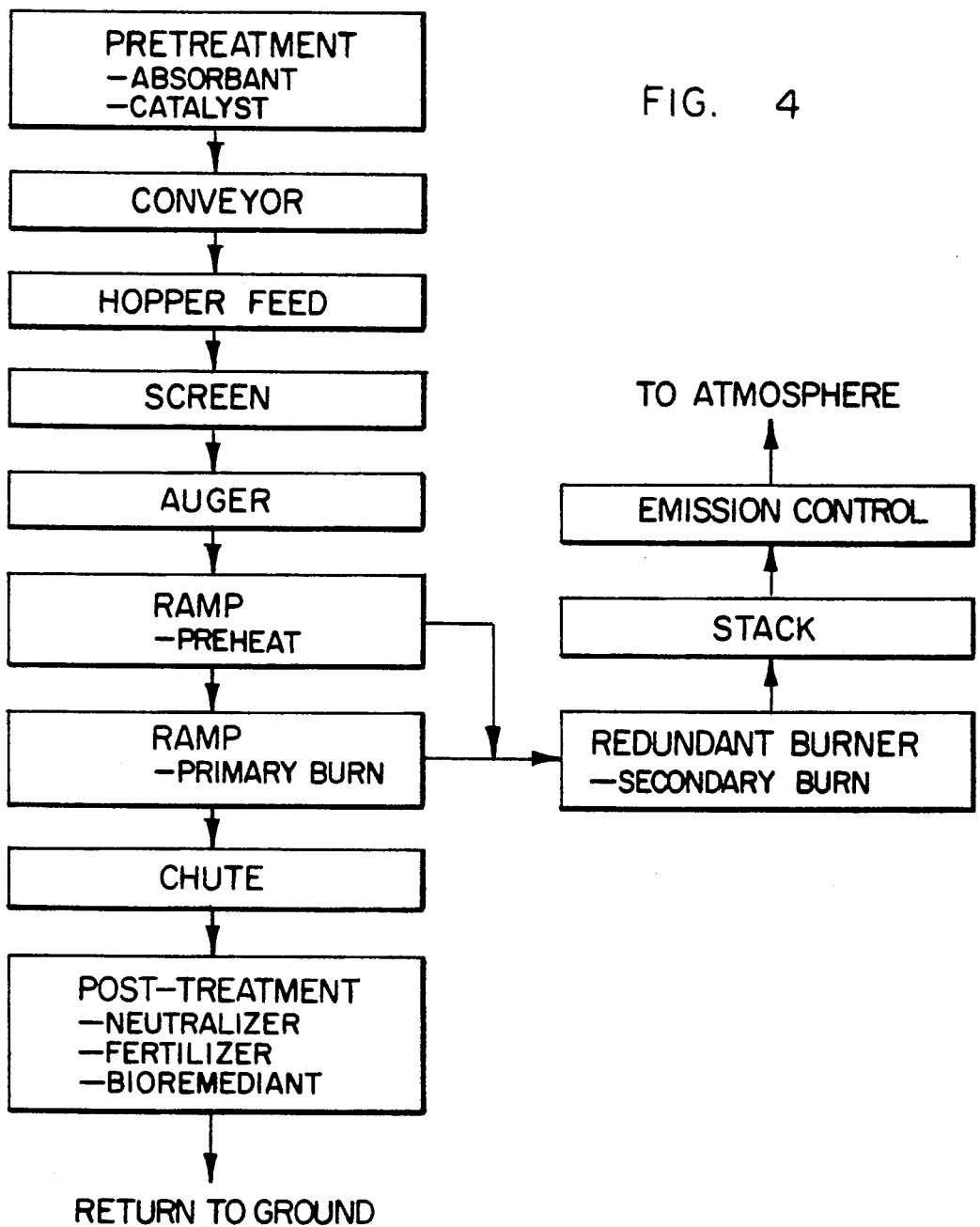
FIG. 4 is a schematic diagram illustrating the sequence of the processing steps of the invention.
Figure 2:
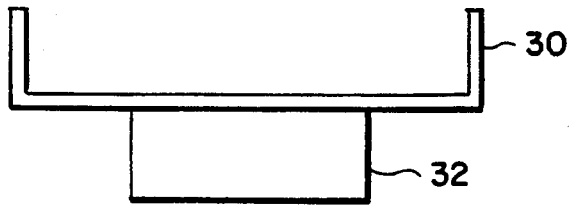
FIG. 2 is an end view of one of the ramps used in the apparatus of FIG. 1 and showing the attached vibrating unit.
Figure 3:
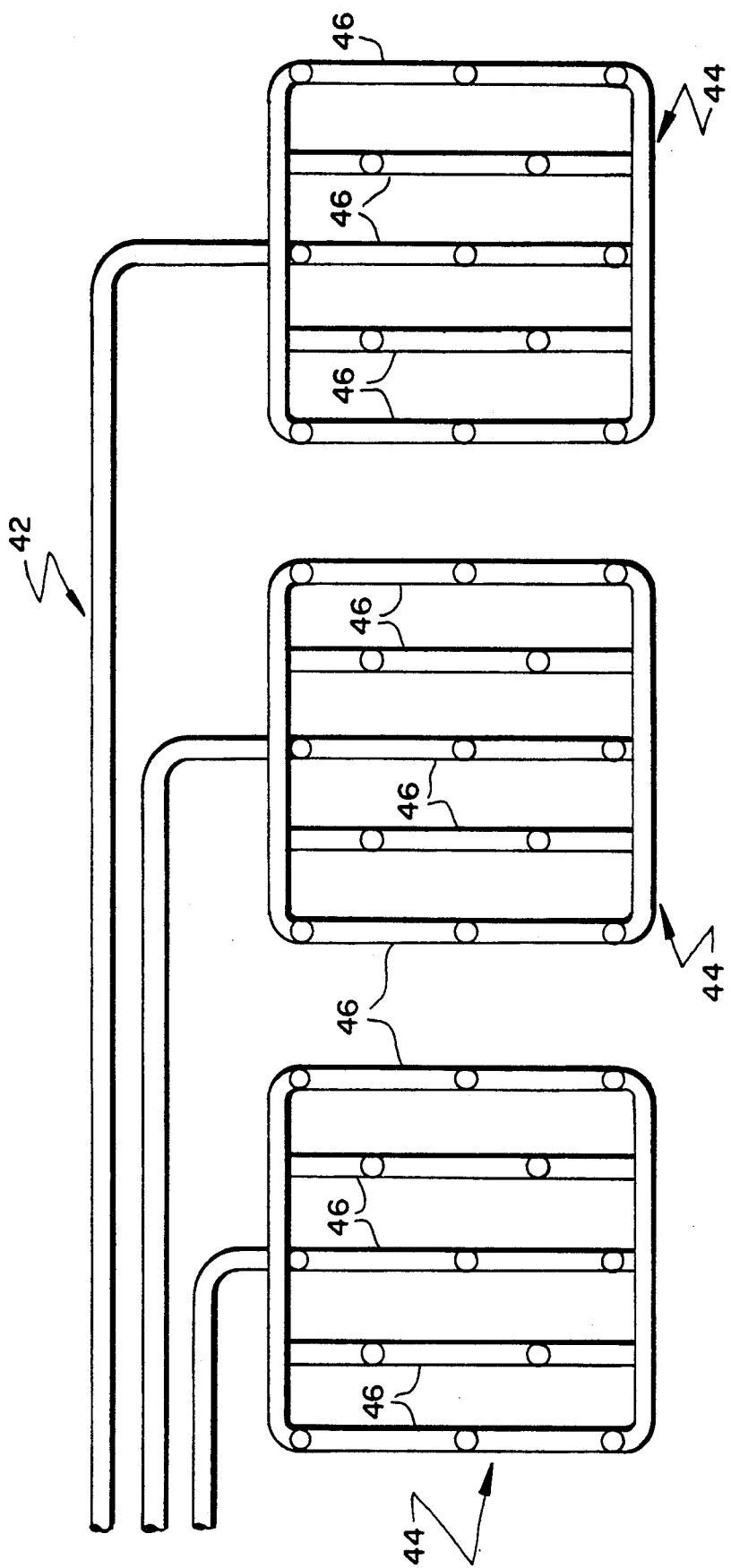
FIG. 3 is an enlarged view of the burner configuration used in the heating stage of the invention.

Positioned above the ramp 34 along most of its length is a burner assembly indicated generally by the reference numeral 42. The burner assembly 42 is supplied with a source of fuel (not shown) such as propane gas. As illustrated in FIG. 4, burner assembly 42 consists of a plurality of burner arrays 44, each having a plurality of burner heads 46 with discharge openings that produce flames. The burner assembly 42 is preferably arranged so that the flames produced from the orifices in burner heads 46 will cover substantially all of the area above the ramp 34. Also, burner assembly 42 is preferably arranged so that the flames will extend downwardly toward the ramp 34 to provide open flames a relatively short distance above the ramp 34. Thus, as the particles of soil are moved downwardly on ramp 34 and are projected upwardly into the air by the vibrating units 36, the particles will be directed into the open flames of the burner assembly 42. By exposing the soil particles to the open flames, the particles are instantly heated to a temperature sufficiently high to volatilize hydrocarbons and other contaminants from the soil. Also, the vapors thus produced are instantly burned by the burner flames. Because of the length of the burner assembly 42, the soil particles are repeatedly "flashed" in this manner so that by the time the particles reach the discharge end 40 of the ramp 34, all of the contaminants will have been volatilized from the soil particles and burned.

Because the burner assembly 42 is open, a considerable amount of heat will rise inside of the apparatus by natural convection. The particles of soil traveling down the first ramp 30 will pass through this rising heat and be pre-heated, with any substances having low vaporization temperatures being volatilized a this time.

At the discharge end 40 of the ramp 34, the contamination-free particles are delivered by gravity onto a slide or chute 50 for discharge from the apparatus. At this time, the particles of soil, now free of contamination, can be delivered in any suitable manner to the desired location. If the apparatus is being operated on-site, the material can be returned to the area from which it was originally excavated. In the alternative, the contaminant-free material can be guided by chute 50 into a transport vehicle or other conveyor for delivery to the desired location.

If desired, the chute 50 may also be provided with vibrating units (not shown) to assist in delivery of the material. Vibrating of the material as it passes down the chute 50 will increase the rate of cooling of the material before it is discharged back to the ground or to other delivery systems. Also, the decontaminated soil may now receive any other additional treatment, such as fertilization or neutralization to a desired pH level.

Because the volatile substances in the soil particles will not only be driven out of the soil particles, but burned by direct contact with the flames of the burner assembly 42, the gases that rise to the top of the apparatus should be free of toxic or other substances. However, to assure that all toxic substances have been volatilized and burned, it may be desireable to provide a secondary burner assembly 52 just beneath the upper wall 14. In any event, the hot vapors that rise by natural convection are directed either directly into the atmosphere or into a discharge stack 54 which may contain an emission control device 56 such as a bag filter, cyclone, electrostatic precipitator, catalytic convertor or similar device. Whether or not additional emission control devices will be necessary depends upon the substances being volatilized from the material being treated as well as regulations regarding the discharge of vapors into the atmosphere.

If desired, the apparatus may be provided with temperature sensors (not shown) positioned throughout the apparatus for safety reasons to prevent excessive heat within the chamber of the apparatus. However, such temperature monitoring is not necessary for the purpose of practicing the invention.

Power to the apparatus for the purpose of driving the vibrating units 32 and 36 and the conveyor 12 can be provided from any suitable source. If the unit is a mobile unit, a generator 60 is preferably provided as a part of the apparatus. Also, a control panel 58 is provided outside of end wall 22 so that the operator can set the desired temperature of the burner assembly, the speed of the auger 12 and the vibrating speed of the vibrating units 32 and 36.

From the foregoing description, it will be evident that the invention provides a unique method and apparatus for removing contaminants from soil or other substances. The apparatus provides a very efficient way of removing volatile substances from any material, and thus may be used in applications where the substances volatilized are recaptured as useful by-products of the system. In any event, by providing a fully integrated apparatus that is independently operable and mobile, the apparatus of the invention may have many uses beyond its primary use of removing contaminants, such as hydrocarbons, from soil.

The apparatus thus provides a self-contained unit that can be moved from site to site for the quick, efficient and relatively inexpensive decontamination of materials, such as soil. Most importantly, when used to remove contaminants from soil, the soil is now clean and useable, and the present common practice of merely moving the contaminated material from one site to a hazardous disposal site is eliminated. It will be further evident to those skilled in the art that both pre-treatment and post-treatment of the material can also occur while utilizing the method and apparatus of the invention. For example, catalysts can be added to the soil prior to pre-heating, and as previously mentioned, post-treatment with fertilizer or neutralizing agents can also readily be added to the overall process in any particular application. The method of the invention also readily allows for the prophylactic addition of bioremediants to the soil after the contaminates are removed and prior to return of the soil to the ground.

Having described the invention, however, in connection with the preferred embodiment thereof, it will be evident to those skilled in the art that various revisions and modifications can be made to the method and apparatus described herein without departing from the spirit and scope of the invention. It is our intention, however, that all such revisions and modifications as are obvious to those skilled in the art will be included within the scope of the following claims.

What is claimed is as follows:

1. An apparatus for treating solid material containing volatilizable substances, said apparatus comprising: means for breaking up the solids into discrete particles; means for exposing the particles to an open flame a sufficient amount of time to cause the volatile substances quickly to vaporize and burn; and means to preheat the particles before being exposed to the open flame; said means for breaking up the solids into discrete particles including a vibrating conveyor, said conveyor also serving to cause the particles to become airborne so as to expose the particles to the open flame.

2. The apparatus of claim 1 in which the means to preheat the particles includes a first vibrating conveyor that causes the particles to become airborne, the first vibrating conveyor being positioned above the open flame so as to utilize the heat rising from the flame to preheat the particles.

3. The apparatus of claim 2 in which the means for breaking up the solids into discrete particles includes the first vibrating conveyor and also includes a second vibrating conveyor, said second conveyor also serving to cause the particles to become airborne so as to expose the particles to the open flame.

4. The apparatus of claim 3 in which the means for exposing the particles to an open flame a sufficient amount of time to cause the volatile substances quickly to vaporize and burn includes a plurality of gas-fired primary burners, and the second conveyor passes directly beneath the primary burners.

5. The apparatus of claim 4 in which there is provided a secondary gas burner located above the primary burners so as to burn any substances in the vapors produced by the burning of the volatilizable substances in the particles by the primary burners.

6. The apparatus of claim 4 in which the components are enclosed by side walls, end walls and a top wall so as to confine the heat and vapors, the top wall having a discharge opening providing for controllably discharging the vapors produced by the burning of the particles.

7. The apparatus of claim 6 in which there is provided a hopper on the top wall and a feed conveyor beneath the hopper for conveying the material discharged from the hopper onto the first vibrating conveyor.

8. The apparatus of claim 7 in which the feed conveyor is of the screw type so as to disaggregate the material discharged from the hopper.

9. The apparatus of claim 8 in which the material being treated is contaminated soil, and means is provided to make the apparatus mobile so it can be moved from one treatment site to another.

10. A method for treating solids containing volatilizable substances to remove said substances from the solids, said method comprising: passing the solids through a screen to separate the large particles and foreign material from smaller discrete particles contained in the solids; passing the smaller discrete particles down a first downwardly-inclined ramp; preheating the smaller discrete particles as they move down said first ramp; discharging the preheated particles from said first ramp onto a second downwardly-inclined ramp; causing open flames to be directed into the path of the particles on said second ramp; continuously vibrating the second ramp as the particles pass down it to casue the particles to become airborne and thereby pass repeatedly through the open flames as the particles move down the second ramp, thereby quickly volatilizing the contaminates in the particles into vapors; and burning with said open flames said vapors to reduce the amount of contaminates in the emissions from the buring of the particles.

11. The method of claim 10 in which the particles are treated with a catalyst prior to preheating.

12. The method of claim 10 in which the particles are treated with a desiccant prior to preheating.

13. The method of claim 10 in which the emissions are treated prior to discharge to remove any contaminates remaining in the emissions.

14. The method of claim 13 in which the emissions are burned prior to discharge so as to remove the contaminates.

* * * * *